Sept. 8, 1953 G. NEUMANN 2,651,669
HERMETICALLY SEALED STORAGE BATTERY
Filed March 3, 1948 2 Sheets-Sheet 1
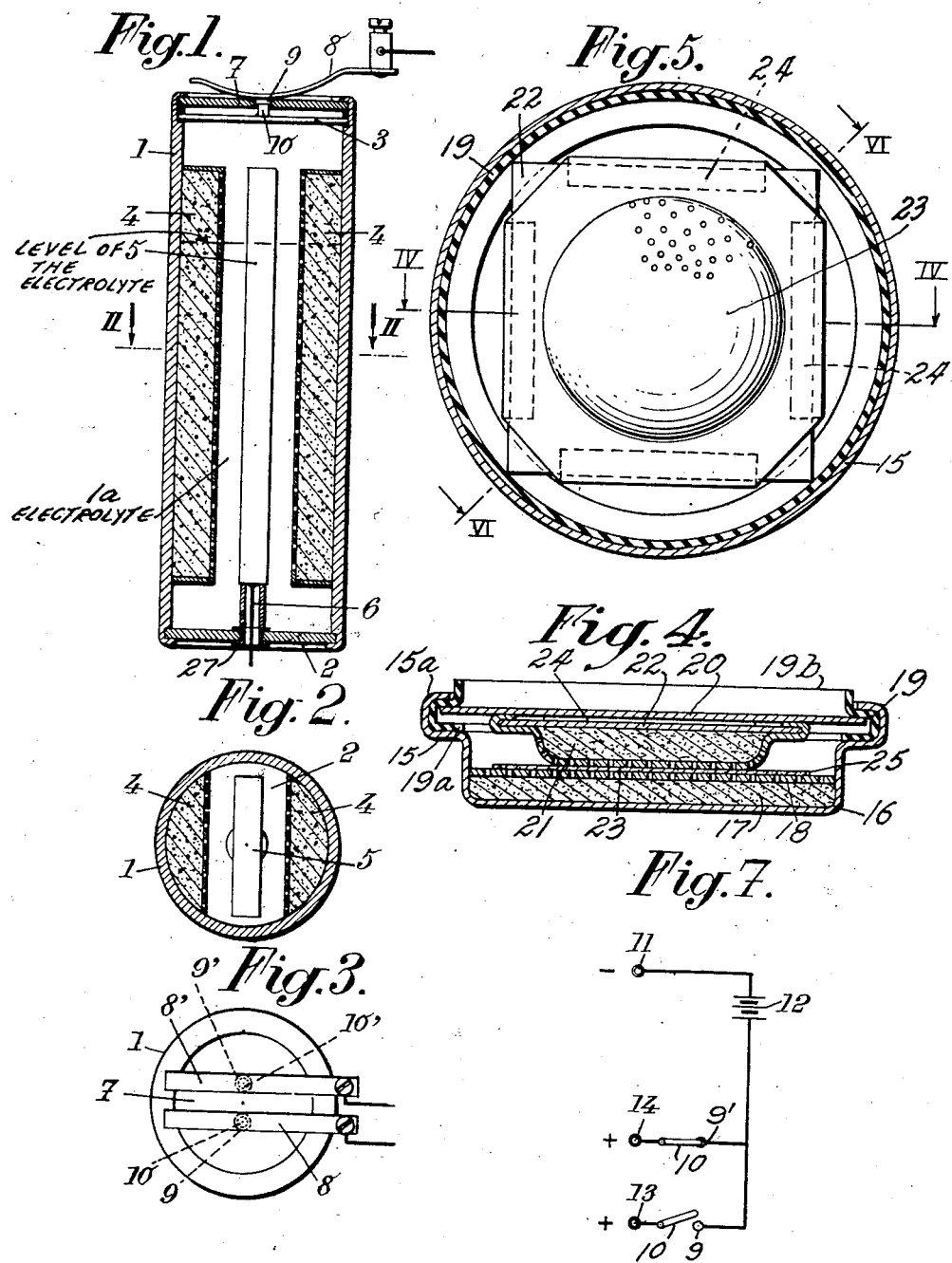
INVENTOR
GEORG NEUMANN
BY
ATTORNEY Sept. 8, 1953  G. NEUMANN  2,651,669
HERMETICALLY SEALED STORAGE BATTERY
Filed March 3, 1948  2 Sheets-Sheet 2
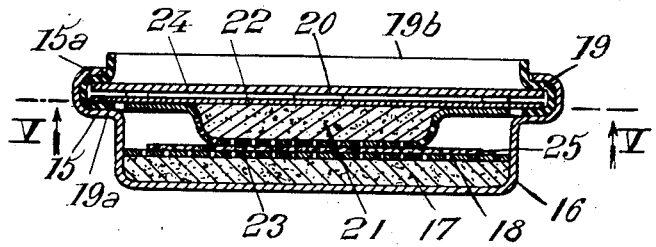
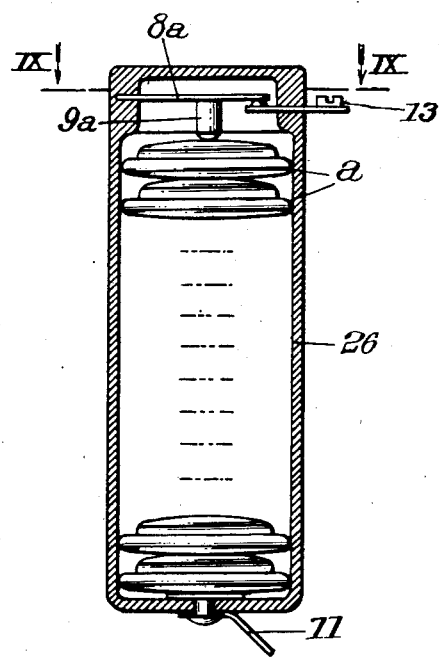
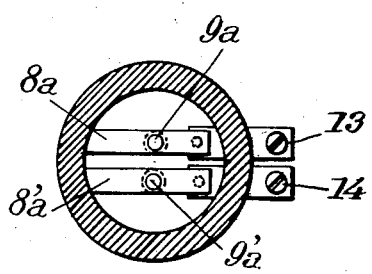
INVENTOR.
GEORG NEUMANN
BY *Fritz G. Hirshnel*
AGENT.

Patented Sept. 8, 1953

2,651,669

UNITED STATES PATENT OFFICE 2,651,669

HERMETICALLY SEALED STORAGE BATTERY

Georg Neumann, Paris, France, assignor to Bureau Technique Gautrat, S. A. R. L., Paris, France, a society of France Application March 3, 1948, Serial No. 12,785
In France March 14, 1947

3 Claims. (Cl. 136—182)

The present invention relates to accumulators in general and, more particularly, alkaline accumulators.

My invention is concerned with accumulators in which the gases that are formed, especially near the end of the charging operation, are retransformed by recombination.

According to a feature of the present invention, my accumulator has a wholly fluidtight vessel and is provided with automatic means operative in response to variations of a factor capable of indicating the end of the charging operation, for cutting off the charging current when the accumulator is charged.

According to a particularly advantageous embodiment, I make use, as factor of the kind above referred to, of the pressure existing inside the accumulator so as to cut off the charging current when this pressure reaches a predetermined value.

Preferred embodiments of my invention will be hereinafter described with reference to the accompanying drawings, given merely by way of example and in which:

Figs. 1 to 3 are a longitudinal section, a cross section and a plan view, respectively, of an alkaline type accumulator element made according to my invention;

Fig. 4 is a cross section on an enlarged scale taken on line IV—IV of Fig. 5, showing another cell element of an accumulator of the alkaline type according to my invention, this cell being in particular intended to be used for constituting batteries of superposed or juxtaposed accumulator cells;

Figs. 5 and 6 are a plan view and a sectional view on the line VI—VI of Fig. 5, respectively, of the accumulator element shown by Fig. 4;

Fig. 7 is a diagrammatical view illustrating a special arrangement of the charging and discharging contacts of an accumulator element made according to the invention or of a battery of such elements.

Fig. 8 is an elevational view of a storage battery composed of a plurality of cell elements similar to Fig. 4 in stacked condition, and Fig. 9 is a cross-section taken on line IX—IX of Fig. 8, showing switches for controlling the charging and discharging circuit.

The accumulator illustrated by Figs. 1 to 3 is, by way of example, an alkaline type storage battery cell.

This accumulator includes, according to the invention, a wholly fluidtight vessel I, the oxyhydric gas that is formed inside the accumulator, in particular at the end of the charging operation, being transformed into water by the recombination of its components, to wit oxygen and hydrogen.

Vessel I, which is, for instance, made of iron, consists of a cylindrical lateral wall, a rigid bottom 2 and a cover 3 constituted by a diaphragm having a certain elasticity. In this vessel are housed two anodes 4 constituted by nickel oxide enclosed in perforated nickel boxes, this nickel oxide being in contact with the metallic wall of the vessel. Between these anodes 4 is located an iron or cadmium cathode 5 connected through a conductor 6 with a suitable terminal. A grommet 27 supporting the cathode 5 is tightly inserted in the base 2 and seals hermetically the electrolyte space against the outside. The inside of the vessel is partly filled with an electrolyte Ia constituted by a caustic potash solution.

The anodes 4 are connected to a positive terminal through a switch constituted by an elastic plate 8 normally in contact with a disc 7 fixed to the upper end of vessel I. Diaphragm 3 carries a stud 10 made of an insulating material, slidable through a hole 9 of disc 7.

Operation of this accumulator, when it is being charged, takes place as follows:

As long as it is not wholly charged, the pressure inside the accumulator, despite the fact that vessel I is closed in a fluidtight manner, is too low to produce any substantial deformation of diaphragm 3. The charging current can therefore flow from the positive terminal, through spring 8, disc 7, wall I, anodes 4, the electrolyte, cathode 5 and conductor 6, to the negative terminal. When the charging operation is finished, the output of hydrogen and oxygen causes the pressure inside the accumulator vessel to rise so that diaphragm is deflected outwardly. Stud 10 lifts spring 8 away from disc 7 and thus breaks the charging circuit. The charging current is thus cut off before the pressure inside the accumulator can rise to a value which might involve destruction of the accumulator vessel.

In view of the fact that the pressure that has cut off the charging current remains for a certain time inside the accumulator, i. e. as long as hydrogen and oxygen present inside the accumulator have not recombined, either together or with the material of the electrodes, it is necessary to provide separate charging and discharging circuits for the accumulator. For instance, as shown by Fig. 7, there are two positive terminals 13 and 14, the switch automatically operated at the end of the charging operation being inserted only in the charging circuit (terminal 13), whereas, normally, the discharge circuit (terminal 14) remains closed, so as to permit of using the accumulator immediately after it has been charged.

However, for safety purposes, I may provide a second switch in the discharge circuit (terminal 14) in order to avoid destruction of the accumulator if someone mistakenly charged accumulator 12 not through its charging circuit 11—13 but through its discharge circuit 11—14. This second switch 8', 9', 10' (Fig. 3) differs from the first switch 8, 9, 10 in that its stud 10', also carried by diaphragm 3, is shorter than stud 10, so that stud 10' lifts spring 8' and thus cuts off the contact between 8' and 7 for a pressure inside the accumulator vessel higher than that which causes contact to be cut off between spring 8 and disc 7.

Recombination of the oxygen and hydrogen gases that are formed at the end of the charging operation is accelerated, on the one hand, by the fact that a substantial pressure is allowed to build up inside the accumulator at the end of the charging operation before switch 7, 8, 9 is operated.

On the other hand, it seems that at least a portion of the gases that are formed combine with the accumulator electrodes. This is why this accumulator is so shaped that, for any position thereof, the gases formed at the end of the charging operation can come into contact with the accumulator plates, which are not wholly immersed in the electrolyte.

The fact that the accumulator is fully fluidtight has many advantages:

No loss of electrolyte through evaporation and no alteration of the electrolyte through contact with the surrounding atmosphere are possible;

A fully fluidtight accumulator can be made of very small size, containing but a small amount of electrolyte liquid;

Finally, any outflow of detonating gas (oxyhydric gas) is prevented.

In the second embodiment of my invention, illustrated by Figs. 4 to 6, the accumulator is so shaped that it is possible to constitute batteries of accumulator elements by mere juxtaposition of superposition of these elements, which can be made of very small size. This possibility is obtained through the fact that the two opposed faces of the accumulator element vessel are constituted, at least partly, by metallic pieces insulated from each other and respectively connected with the anode and cathode of the accumulator.

In Figs. 4 to 6, reference numeral 15 designates a metallic envelope constituting a portion of the accumulator vessel, this envelope including a cylindrical recess 16 in which can be housed the anode, which is constituted by a certain amount of nickel oxide 17 covered by a perforated plate 18 of nickel or nickel plated iron. In the main portion of envelope 15 is housed a grooved ring 19 of an insulating material. On the lower portion 19b of this ring rests the flanges of a cathode structure shown separately by Figs. 5 and 6 and which includes a certain amount of iron or cadmium powder 21 enclosed between a plate 22 and a perforated plate 23, both of iron, the outer edges of plate 23 being folded at 24 over the corresponding edges of plate 22. Between these anode and cathode structures there is interposed a piece of blotting paper 25 impregnated with electrolyte, for instance a solution of caustic potash.

Above the cathode is placed a plate 20 which closes the accumulator vessel and further constitutes a diaphragm capable of cutting off the charging current under the influence of the rise of pressure inside the accumulator. Plate 20 is held in position by the folding over of the edges 15a of envelope 15 and 19b of ring 19.

In this way, I provide a dish-shaped accumulator element which can easily be associated to form a battery with other elements of similar shape piled upon one another, the portion 16 of each element being engaged into the hollow space left inside the edge 19b and above the closure plate 20 of the next element located under that considered.

If, at the end of the charging operation of an accumulator as shown by Figs. 4 to 6, a certain amount of detonating gas is developed inside said accumulator, the pressure of this gas causes closure plate 20 to bulge outwardly.

In a battery obtained by superposing a plurality of elements as above described, the deformations of the plates 20 of these elements are added together and produce an increase of the height of the battery which is then advantageously utilized for cutting off the charging current.

Such a battery is shown by way of example in Fig. 8. A number of flat cell elements similar to that illustrated in Fig. 4 are placed one above the other in a container 26 made of insulating material. At the bottom of the container a terminal 11 is provided which is connected to the electrode of the lowermost cell, in this particular case the negative electrode. This terminal is connected with the two terminals 13 and 14 of opposite polarity, which are provided at the top of the container and are electrically connected with the opposite electrode of the uppermost cell.

One of the terminals 13 and 14 is connected to the charging circuit and the other to the discharging circuit. 8a and 8a' are switch contacts which are electrically connected (not shown) with the metallic closure plate or diaphragm 20 (Fig. 4) and which are normally in contact with the terminals 13 and 14.

The metallic blades of the switches 8a and 8a' are disconnected from the terminals 13 and 14 by means of studs 9a and 9a' actuated by the bulging diaphragm or displacement of the uppermost cell. The stud controlling the switch for the charging circuit is longer than that controlling the switch for the discharging circuit so that the charging circuit is interrupted first. The opening of the discharging circuit requires a greater axial expansion of the stack of cell "$a$" than the opening of the charging circuit.

The accumulator arrangement as illustrated by Figs. 4 to 6 permits of obtaining accumulators of very small size. For instance, the elements may be of a height of from 2 to 5 millimeters and a diameter from 15 to 20 millimeters.

Whatever be the embodiment that is chosen, it is advantageous to provide for a constant balance between the oxygen gas and the hydrogen gas developed inside the accumulator. For this purpose, the plates may be inserted in the accumulator after they have been given completely equal charges and also equal active masses. The accumulator vessel is then closed.

According to a particularly advantageous embodiment, the plates are fully charged before closing the accumulator, which avoids the necessity of making the active masses of the electrodes exactly equal.

In the above described embodiments, the factor used for cutting off the charging current at the end of the charging operation is the pressure developed inside the accumulator vessel, which pressure acts upon a deformable or movable element (diaphragm). However, it should be noted that my invention includes other embodiments in which the factor the variations of which are used for automatically cutting off the charging current is not necessarily the pressure but, for instance the voltage, which generally varies as soon as the charging operation is finished, or the electrolyte concentration.

The accumulators according to my invention can be used in all applications where accumulators are presently used and their advantages result from the preceding explanations.

Due to the very small dimensions that can be obtained with accumulators according to the present invention, their application is particularly useful when it is desired to provide batteries of minimum volume. In particular they are very advantageous in connection with amplifiers for portable radio sets (either transmitters or receivers), for hearing aids, etc. These accumulators can be used to constitute both heating batteries and plate batteries.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a hermetically sealed storage battery cell at least one electrode of one polarity and at least one electrode of the opposite polarity, a first terminal, means for connecting said first terminal to one of said electrodes, two other terminals, means for connecting said two latter terminals in parallel to the electrode of the opposite polarity, a switch for opening and closing the connecting means between one of said latter terminals arranged for charging the battery cell and the electrode of the opposite polarity, and pressure responsive means associated with the battery cell and adapted to open the switch under the pressure of gases generated during the charging operation.

2. A storage battery cell comprising a negative electrode, a positive electrode, an electrolyte, a vessel hermetically sealing said electrodes and electrolyte, at least one terminal of one polarity and two terminals of the opposite polarity, an electrical connection between said first terminal and one electrode, separate electrical connections connecting in parallel each of said latter terminals and the other electrode, switches in each of said latter connections, means actuated by the pressure of the gases generated within said vessel for operating each of said switches, the means which operates one of said switches being actuated in response to a higher pressure than that which operates the other switch.

3. In an alkaline storage battery cell, an outer container, a negative electrode comprising as the electrolytically active material a finely divided metal selected from the EMF series group consisting of iron and cadmium, a positive electrode comprising as the electrolytically active material nickel oxide, an alkaline electrolyte in said container contacting a substantial portion of the electrodes but leaving a portion of the electrodes always exposed, said container completely and permanently enclosing said electrodes and electrolyte so as to confine the gases generated therein under a pressure sufficient to cause said gases to be moved by reaction with said exposed electrolytically active material of the electrodes, a terminal, and an electrical connection between said terminal and one of the electrodes, a portion of said container forming a fluid-tight membrane bending outwardly under the pressure of the gases generated in the cell and arranged so as to open said electrical connection without releasing the gases.

GEORG NEUMANN.

References Cited in the file of this patent

UNITED STATES PATENTS

| Number | Name | Date |
| --- | --- | --- |
| 382,112 | Sellon | May 1, 1888 |
| 1,016,874 | Edison | Feb. 6, 1912 |
| 1,034,108 | Halbleib | July 30, 1912 |
| 1,073,107 | Edison | Sept. 16, 1913 |
| 1,213,182 | Gardiner | Jan. 23, 1917 |
| 1,240,856 | Kammerhoff | Sept. 25, 1917 |
| 1,377,194 | Edison | May 10, 1921 |
| 2,104,973 | Dassler | Jan. 11, 1938 |
| 2,131,592 | Lange et al. | Sept. 27, 1938 |
| 2,204,101 | Fumagalli | June 11, 1940 |
| 2,269,040 | Rublee | Jan. 6, 1942 |
| 2,416,576 | Franz et al. | Feb. 25, 1947 |
| 2,422,045 | Ruben | June 10, 1947 |
| 2,463,316 | Ruben | Mar. 1, 1949 |

FOREIGN PATENTS

| Number | Country | Date |
| --- | --- | --- |
| 671,707 | France | Sept. 7, 1929 |
| 317,130 | Great Britain | Aug. 12, 1929 |
| 471,240 | Great Britain | Aug. 31, 1937 |
| 554,926 | Great Britain | July 26, 1943 |
| 561,820 | Great Britain | June 6, 1944 |